US008340698B2

(12) United States Patent
Rezaiifar et al.

(10) Patent No.: US 8,340,698 B2
(45) Date of Patent: Dec. 25, 2012

(54) SYSTEM AND METHOD FOR DELIVERING SHORT MESSAGES ON DO AND 1X NETWORKS

(75) Inventors: Ramin Rezaiifar, San Diego, CA (US); Bibhu P. Mohanty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 774 days.

(21) Appl. No.: 11/550,955

(22) Filed: Oct. 19, 2006

(65) Prior Publication Data
US 2007/0135146 A1 Jun. 14, 2007

Related U.S. Application Data

(60) Provisional application No. 60/750,234, filed on Dec. 13, 2005.

(51) Int. Cl.
*H04W 4/00* (2009.01)
(52) U.S. Cl. ............ 455/466; 455/432.1; 455/433; 455/435.1
(58) Field of Classification Search .......... 455/435, 455/445, 466, 432.1, 433, 435.1–435.3, 456.1; 370/320, 328, 335, 342, 352, 441, 466
See application file for complete search history.

(56) References Cited

U.S. PATENT DOCUMENTS

| 7,079,524 | B2 | 7/2006 | Bantukul et al. |
| 7,110,780 | B2 | 9/2006 | Bantukul et al. |
| 2004/0037222 | A1 | 2/2004 | Kim et al. |
| 2004/0233862 | A1* | 11/2004 | Huang et al. ............ 370/320 |
| 2005/0047399 | A1 | 3/2005 | Lee et al. |
| 2005/0059398 | A1* | 3/2005 | Jaupitre et al. ........... 455/435.2 |
| 2005/0063329 | A1 | 3/2005 | Lee et al. |
| 2005/0070251 | A1 | 3/2005 | Satake et al. |
| 2005/0202836 | A1* | 9/2005 | Schaedler et al. ........... 455/466 |

(Continued)

FOREIGN PATENT DOCUMENTS
JP 2005051583 A 2/2005
(Continued)

OTHER PUBLICATIONS

International Search Report—PCT/US06/061959, International Searching Authority—European Patent Office, Jan. 18, 2008.

(Continued)

*Primary Examiner* — Dwayne Bost
*Assistant Examiner* — Bryan Pitt
(74) *Attorney, Agent, or Firm* — Kenneth K. Vu; Kristine U. Ekwueme

(57) ABSTRACT

A method for delivering SMS to ATs in a first communication network providing DO and 1x interfaces and for offloading the delivery of the SMS from a second communication network including an MSC, comprising monitoring a DO control channel for pages by an AT and delivering the SMS in SIP to the AT over the DO interface. The method may further comprise tuning the AT to the DO interface and determining whether the AT is SIP registered for using the DO interface. An application server determines whether the AT is SIP registered for using the DO interface. When the DO interface is not available, the SMS may be delivered over the 1x interface and the method further comprises the AT sending a special SMS to an SMS gateway, which causes the application server to remember that the AT is now monitoring the first communication network including a circuit-switched network.

66 Claims, 9 Drawing Sheets

U.S. PATENT DOCUMENTS

2006/0135157 A1 * 6/2006 Baek et al. .................. 455/433

FOREIGN PATENT DOCUMENTS

| JP | 2007503756 T | 2/2007 |
|----|--------------|--------|
| JP | 2007520152 A | 7/2007 |
| JP | 2008507861 T | 3/2008 |
| TW | 200524335 | 9/2005 |
| WO | WO03003653 A2 | 1/2003 |
| WO | WO2005022939 A1 | 3/2005 |
| WO | WO2005048620 A1 | 5/2005 |
| WO | WO2005074216 A1 | 8/2005 |
| WO | WO2005122604 A2 | 12/2005 |

OTHER PUBLICATIONS

Written Opinion—PCT/US06/061959, International Searching Authority—European Patent Office, Jan. 18, 2008.

* cited by examiner

SYSTEM AND METHOD FOR DELIVERING SHORT MESSAGES ON DO AND 1X NETWORKS

CLAIM OF PRIORITY UNDER 35 U.S.C. §119

The present Application for Patent claims priority to Provisional Application No. 60/750,234, entitled "System and Method for Delivering Short Messages on DO and 1x Networks," filed Dec. 13, 2005, and assigned to the assignee hereof and expressly incorporated by reference herein.

BACKGROUND

1. Field

The present invention generally relates to communication and, in particular, to techniques for providing the Short Message Service (SMS) to be delivered on DO and 1x networks or interfaces and for decreasing the load on the Mobile Switching Center (MSC) interface.

2. Background

Wireless communication networks are widely deployed to provide various types of services such as voice, packet data, broadcast, and so on. These wireless networks include Code Division Multiple Access (CDMA) networks, Global System for Mobile Communications (GSM) networks, Universal Mobile Telecommunications System (UMTS) networks, and so on. A network typically refers to a deployment of a system, although these two terms are also used interchangeably.

Each wireless network utilizes a particular air interface to support over-the-air communication and typically further implements a particular mobile networking protocol that supports roaming and advanced services. For example, a CDMA network utilizes a CDMA air interface and an ANSI-41 networking protocol. The CDMA network may implement one or more CDMA standards such as IS-2000 (1xEV), IS-856 (1x-EVDO), IS-95, and so on. The CDMA network may provide a broadcast service that broadcasts messages to users within the network. The broadcast messages can carry various types of information such as news, traffic reports, weather information, and so on.

The broadcast services in the CDMA networks are implemented with Short Message Service (SMS), which is a service that supports the exchange of short messages between a wireless network and wireless devices (e.g., cellular phones). SMS is network technology dependent, and different SMS implementations have been defined for ANSI-41. Each SMS implementation has different capabilities and utilizes different message types and formats for sending SMS messages. The SMS implementation for an ANSI-41 network is described in a document TIA/EIA-637-B, entitled "Short Message Service for Wideband Spread Spectrum Systems," which is publicly available and incorporated herein by reference. As the amount of broadcast messages increases in the CDMA networks, there is a need to decrease the load on the Mobile Switching Centers (MSCs) by delivering the SMS on the DO interface when it is available.

SUMMARY

The invention relates to systems and methods for decreasing the load on the MSCs by delivering the SMS on the DO interface when it is available. In one aspect, a method is described for delivering SMS to access terminals in a first communication network providing the DO interface and the 1x interface and for offloading the delivery of the SMS from a second communication network. The method comprises monitoring a DO control channel for pages by an Access Terminal (AT) and delivering the SMS encapsulated in Session Initiation Protocol (SIP) to the AT over the DO interface when it is available. In this aspect, the second communication network includes the MSC. The method may further comprise tuning the AT to the DO interface when the DO interface is available, and determining whether the AT is SIP registered for using the DO interface. In this aspect, an application server determines whether the AT is SIP registered for using the DO interface.

In another aspect, when only the 1x interface is available, the method may further comprise notifying the second communication network that the AT did not detect the DO interface, deregistering the AT from the SIP network for SMS service, and delivering the SMS over the 1x interface. With this aspect, the method further comprises the AT sending a special SMS to an SMS gateway, wherein the SMS gateway causes an application server to remember that the AT is now monitoring the first communication network including a circuit-switched network. The SMS gateway further deregisters the AT from the SIP network for SMS service. When the DO interface is available again, the method further comprises performing a SIP registration for the AT to allow the SMS to be delivered over the DO interface.

In another aspect, the AT and the first and second communication networks may engage in a SIP notification where the AT indicates its ability to receive or send SMS on the DO interface and the networks may indicate either a positive or a negative response. With this aspect, the AT originates SMS using SIP on the DO interface if a SIP registration succeeds and if the SIP notification indicates SMS capability.

In another aspect, the OTASP may be used to provision the AT with the capability of SMS over the DO interface. With this aspect, if the AT gets provisioned with SMS over the DO interface capability, then the AT will send or receive SMS over SIP on the DO interface when the DO interface is available.

In another aspect, the method may further comprise a CCCF/NeDS for engaging the first and second communication networks in a SIP notification to determine whether the SMS or voice call is to be delivered on the DO interface or the 1x interface. With this aspect, if the AT is not SIP registered, then the method may further comprise delivering the SMS or voice call on the 1x interface. If the AT is SIP registered, wherein if the AT is indicated as being capable of receiving voice using SIP notification, and wherein if a record for indicating whether the AT is monitoring the DO interface or the 1x interface is set to the DO interface, then the voice call is delivered on the DO interface. If the AT is SIP registered, wherein if the AT is indicated as being capable of receiving SMS using SIP notification, and wherein if a record for indicating whether the AT is monitoring the DO interface or the 1x interface is set to the DO interface, then the SMS is delivered on the DO interface.

In another aspect, wherein if all of the active set members support Voice over IP (VoIP), then the AT sends a SIP notification indicating that a voice call is to be delivered on the DO interface. With this aspect, wherein if at least one of the active set members does not support VoIP, then the AT sends a SIP notification indicating that the voice call is to be delivered on the 1x interface.

DETAILED DESCRIPTION

Figure 1:
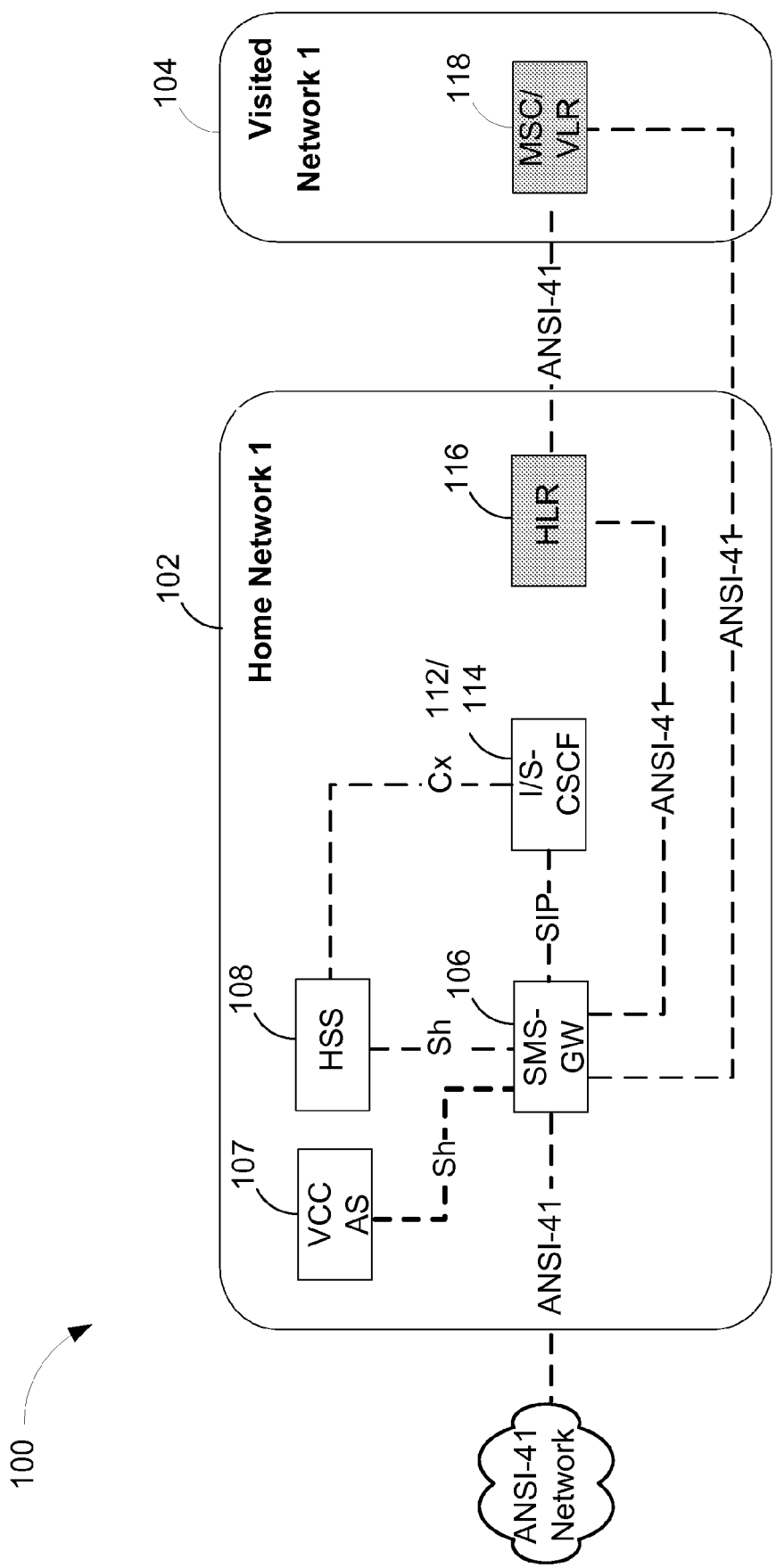
FIG. 1 illustrates a network supporting signaling flows for SMS origination and termination.

The word "exemplary" is used herein to mean "serving as an example, instance, or illustration." Any embodiment described herein as "exemplary" is not necessarily to be construed as preferred or advantageous over other embodiments.

The present invention defines the interactions and signaling flows between, among other things, the Short Message Service-Gateway (SMS-GW) and the
Home Subscriber Server (HSS) and
Serving-Call/Session Control Function (S-CSCF).

In particular, the invention allows the core network to know as closely as possible the current accessibility of the UE and to deliver services efficiently across the appropriate Access Network (AN) while minimizing the impact on the legacy systems.

The following are acronyms and definitions used to describe the invention:

ACRONYMS

ANSI American National Standards Institute
AS Application Server
AT Access Terminal
AUTHR Authentication Response
BGCF Border Gateway Control Function
BSC Base Station Controller
CIC Circuit Identification Code
CS Circuit-Switched
CSCF Call/Session Control Function
DBM Data Burst Message
ESN Electronic Serial Number
ESS Extended Service Set
GW Gateway
HDR High Data Rate
HLR Home Location Register
HO Handoff
HRPD High Rate Packet Data
HSS Home Subscriber Server
IMS IP Multimedia Subsystem
IMSI International Mobile Subscriber Identity
IPv4 Internet Protocol version 4
IPv6 Internet Protocol version 6
I-CSCF Interrogating-CSCF
ISUP ISDN User Part
MDN Mobile Directory Number
Megaco Media Gateway Control
MGCF Media Gateway Control Function
MOW Media Gateway
MIN Mobile Identification Number
M-L Mobile-to-Land
M-M Mobile-to-Mobile
MMD Multimedia Domain
MS Mobile Station
MSC Mobile Switching Center
OTASP Over the Air Service Provisioning
PCM Pulse Code Modulation
P-CSCF Proxy-CSCF
PDIF Packet Data Interworking Function
PDSN Packet Data Serving Node
PSTN Public Switched Telephone Network
RTP Real-time Transport Protocol
SIP Session Initiation Protocol
SMS Short Message Service
S-CSCF Serving-CSCF
SDP Session Description Protocol
STA Station
TDM Time Division Multiplexing
TLDN Temporary Local Directory Number
UDP User Datagram Protocol
UE User Equipment
VCC AS Voice Call Continuity Application Server.
VoIP Voice over IP
VLR Visitor Location Register
WLAN Wireless Local Area Network

DEFINITIONS

VCC AS An entity that:
  (1) assists in routing calls received from either the IMS network or PSTN to a terminal that is either 1x CS registered or IMS registered, or both and
  (2) is involved in voice call setup signaling to facilitate HRPD/WLAN VoIP-to-1x circuit-switched voice handoffs and 1x circuit-switched voice to HRPD/WLAN VoIP handoffs.
SMS-GW An entity that stores and forwards SMS messages to and from a terminal that is either IMS registered or 1x CS registered.

An HDR subscriber station, referred to herein as an access terminal, may be mobile or stationary, and may communicate with one or more HDR base stations, referred to herein as Modem Pool Transceivers (MPTs). An access terminal transmits and receives data packets through one or more modem pool transceivers to an HDR Base Station Controller (BSC) or a Modem Pool Controller (MPC). Modem pool transceivers and modem pool controllers are parts of a network called an access network. An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel. An access terminal may further be any of a number of types of devices including but not limited to PC card, compact flash, external or internal modem, or wireless or wireline phone. The communication link through which the access terminal sends signals to the modem pool transceiver is called a reverse link. The communication link through which a modem pool transceiver sends signals to an access terminal is called a forward link.

Signaling Flows for SMS

Referring to FIG. 1, there is shown an architecture 100 supporting signaling flows for SMS origination and termination. For example, if a mobile is registered in both a home network 102 and a visited network 104, an SMS-GW 106 may decide which channel to use for initial SMS delivery attempt to the mobile, i.e., either IMS or over the circuit-switched network. More specifically, the SMS-GW 106 may select the delivery channel based on either the SMS-GW local configuration information (i.e., operator's preference), or the mobile user provisioning information (i.e., the subscriber's preference), or both. If both the local configuration and the user provisioning information are supported by the operator, then the SMS-GW 106 may base the channel selection on the user provisioning information (i.e., the subscriber's preference). In case the initial preferred delivery attempt fails, then the SMS-GW 106 may try to deliver via the alternate channel.

Initial IMS Delivery Attempt: Success Scenario

Figure 2:
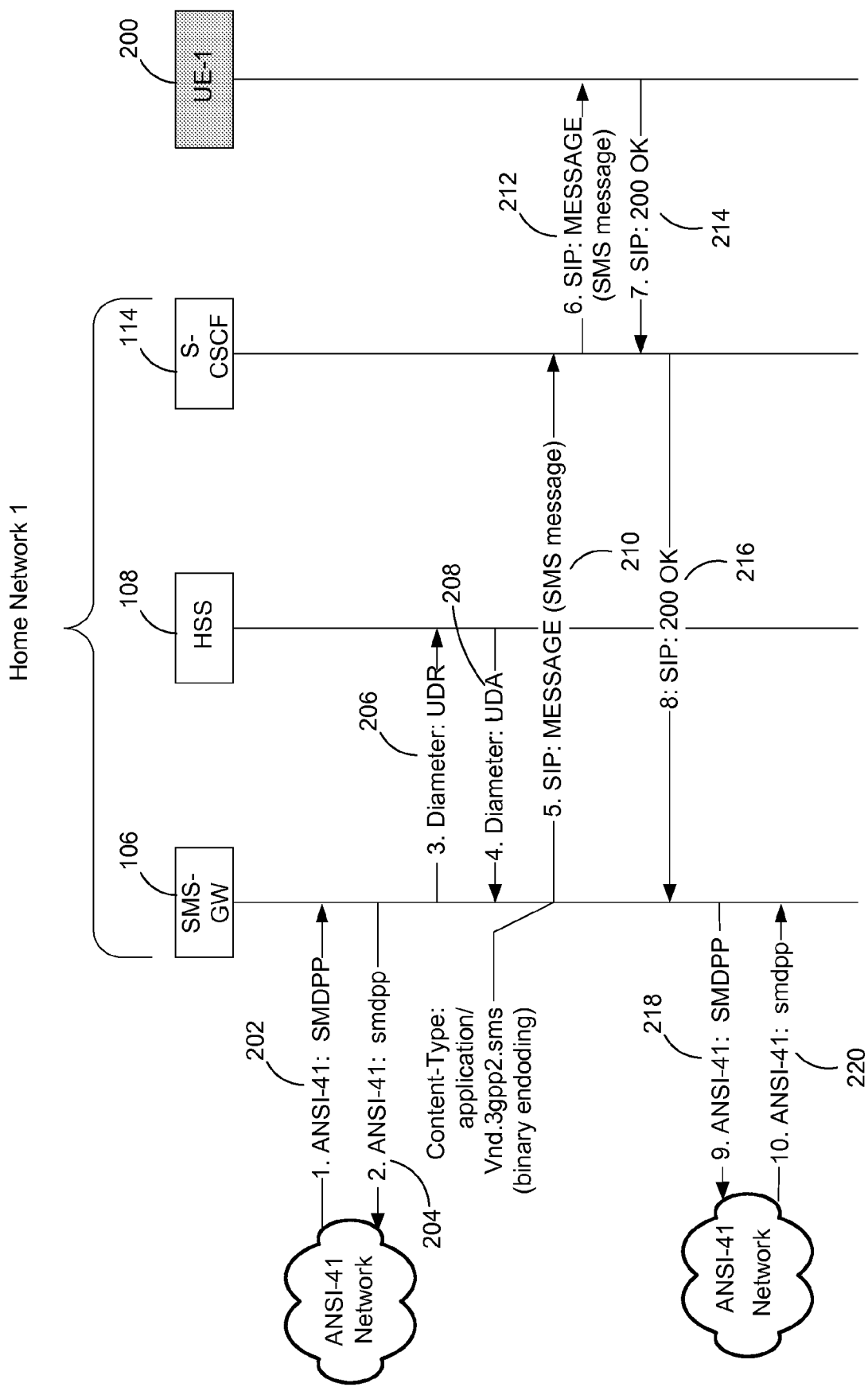
FIG. 2 illustrates a signaling flow for a scenario where a terminal is SIP registered and tuned to HRPD, and the terminal receives an SMS message.

Referring to FIG. 2, there is shown a signaling flow for a scenario where a terminal is SIP registered and tuned to HRPD, and receives an SMS message. With this aspect, 1. The SMS-GW 106 for UE 200 receives an ANSI-41 SMDPP message 202 for UE 200 from an originating SMS-GW. The originating SMS-GW is not shown for brevity.
2. The SMS-GW 106 responds by sending an ANSI-41 smdpp message 204 back to the originating SMS-GW.
3. The SMS-GW 106 is provisioned to use IMS, and hence the SMS-GW 106 sends a Diameter User-Data-Request message 206 to the HSS 108 to determine whether or not UE 200 is IMS registered. The SMS-GW 106 queries the HSS 108 using the MDN of the UE 200 received in step 1.
4. The HSS 108 responds by sending a Diameter User-Data-Answer message 208 to the SMS-GW 106 indicating that UE 200 is IMS registered. If the UE 200 is IMS registered, then the HSS 108 also returns UE 200's S-CSCF 114 address.
5. The SMS-GW 106 sends a SIP MESSAGE 210 to UE 200's S-CSCF 114 containing the SMS message received in Step 1. The Content-Type value associated with the SIP MESSAGE may be "application/vnd.3gpp2.sms". The payload of the SIP MESSAGE may all contain a binary encoded SMS transport layer message.
6. The S-CSCF 114 forwards the SIP MESSAGE 212 to UE 200 via UE 200's P-CSCF. The UE 200's P-CSCF is not shown for brevity.
7. The UE 200 responds by sending a SIP 200 OK message 214 back to the SMS-GW 106 via UE 200's P-CSCF and S-CSCF 114. The UE 200's P-CSCF is not shown for brevity.
8. The UE 200's S-CSCF 114 forwards the SIP 200 OK message 216 to the SMS-GW 216.
9. If required in the original ANSI-41 SMDPP message, then the SMS-GW 106 generates ANSI-41 SMDPP message 218 to the originating SMS-GW to inform it about the delivery status.
10. The originating SMS-GW responds by sending an ANSI-41 smdpp message 220 back to SMS-GW 106.

Initial IMS Delivery Attempt, Not IMS Registered: CS Delivery Success

Figure 3:
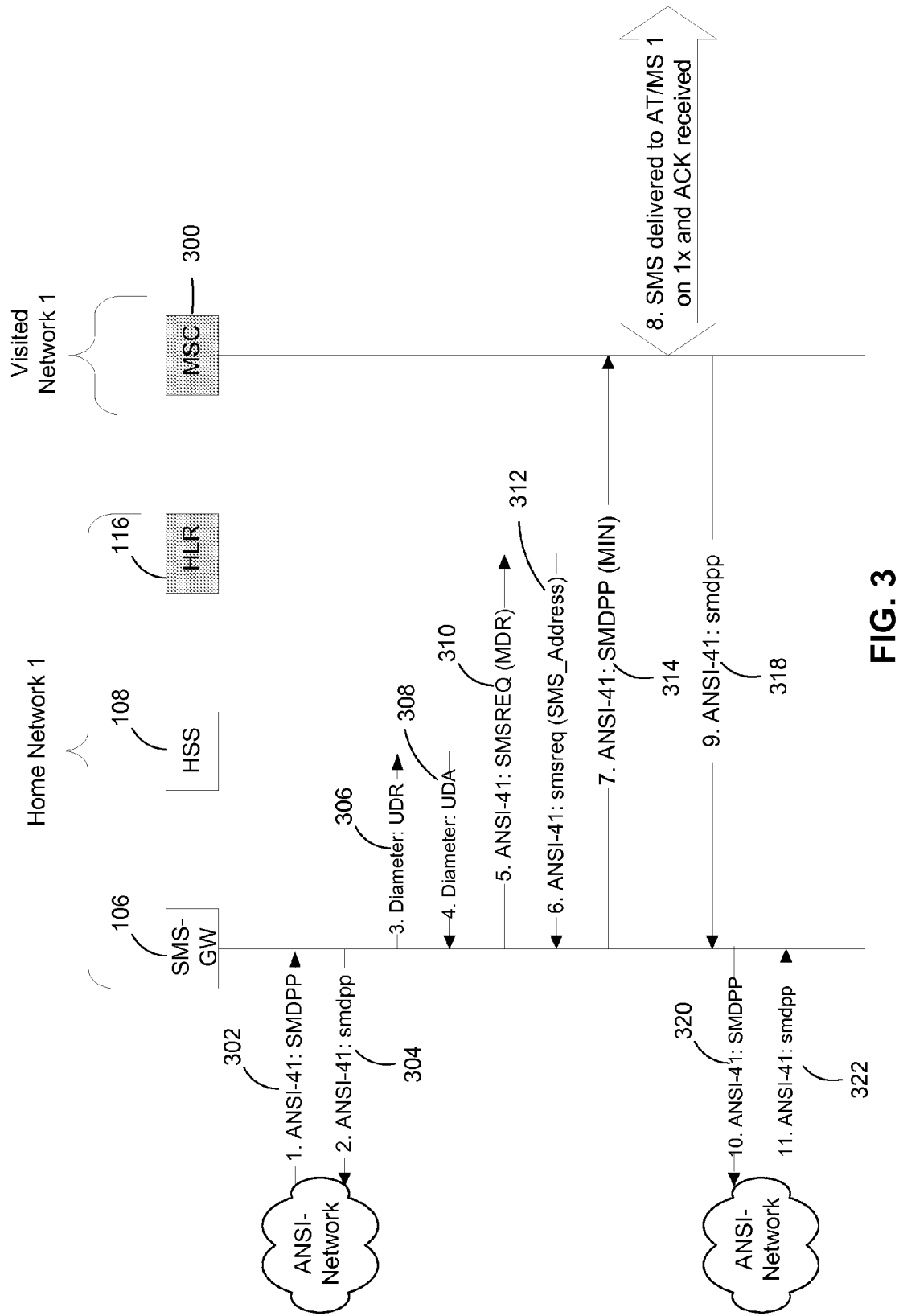
FIG. 3 illustrates a signaling flow for a scenario where a terminal is not IMS registered but is CS registered and tuned to 1x, and the terminal receives an SMS message.

In another aspect, FIG. 3 illustrates a signaling flow for a scenario where a terminal is not IMS registered but is CS registered and tuned to 1x, and receives an SMS message. With this aspect, 1. The SMS-GW 106 for the UE receives a MAP SMDPP message 302 for the UE from an originating SMS-GW. The originating SMS-GW and the UE are not shown for brevity.
2. The SMS-GW 106 responds by sending a MAP smdpp message 304 back to the sender of the MAP SMDPP message.
3. The SMS-GW 106 is provisioned to use IMS, and hence the SMS-GW 106 sends a Diameter User-Data-Request message 306 to the HSS 108 to determine whether or not the UE is IMS registered. The SMS-GW 106 queries the HSS 108 using the MDN of the UE received in step 1.
4. The HSS 108 responds by sending a Diameter User-Data-Answer message 308 to the SMS-GW 106 indicating that the UE is not IMS registered.
5. The SMS-GW 106 sends a MAP SMSREQ 310 to the HLR 116 containing the UE's MDN in order to determine the UE's current routing information and retrieve the UE's MIN info.
6. The HLR 116 sends a MAP SMSREQ message 312 back to the SMS-GW 106 containing the UE's MIN and SMS address (i.e., MSC/VLR 118 address).
7. The SMS-GW 106 sends a MAP SMDPP message 314 containing the UE's MIN to a MSC 300 identified by the SMS address (i.e., MSC/VLR 118 address) in the Visited Network for the UE.
8. The SMS message is delivered to the UE on 1x and a Layer 2 ACK is received. The UE is not shown for brevity.
9. The MSC 300 in the Visited Network for the UE sends a MAP smdpp message 318 back to the SMS-GW 106.
10. If required in the original ANSI-41 SMDPP message, then the SMS-GW 106 generates an ANSI-41 SMDPP message 320 to the originating SMS-GW to inform it about the delivery status.
11. The originating SMS-GW responds by sending an ANSI-41 smdpp message 322 back to the SMS-GW 106.

Figure 4:
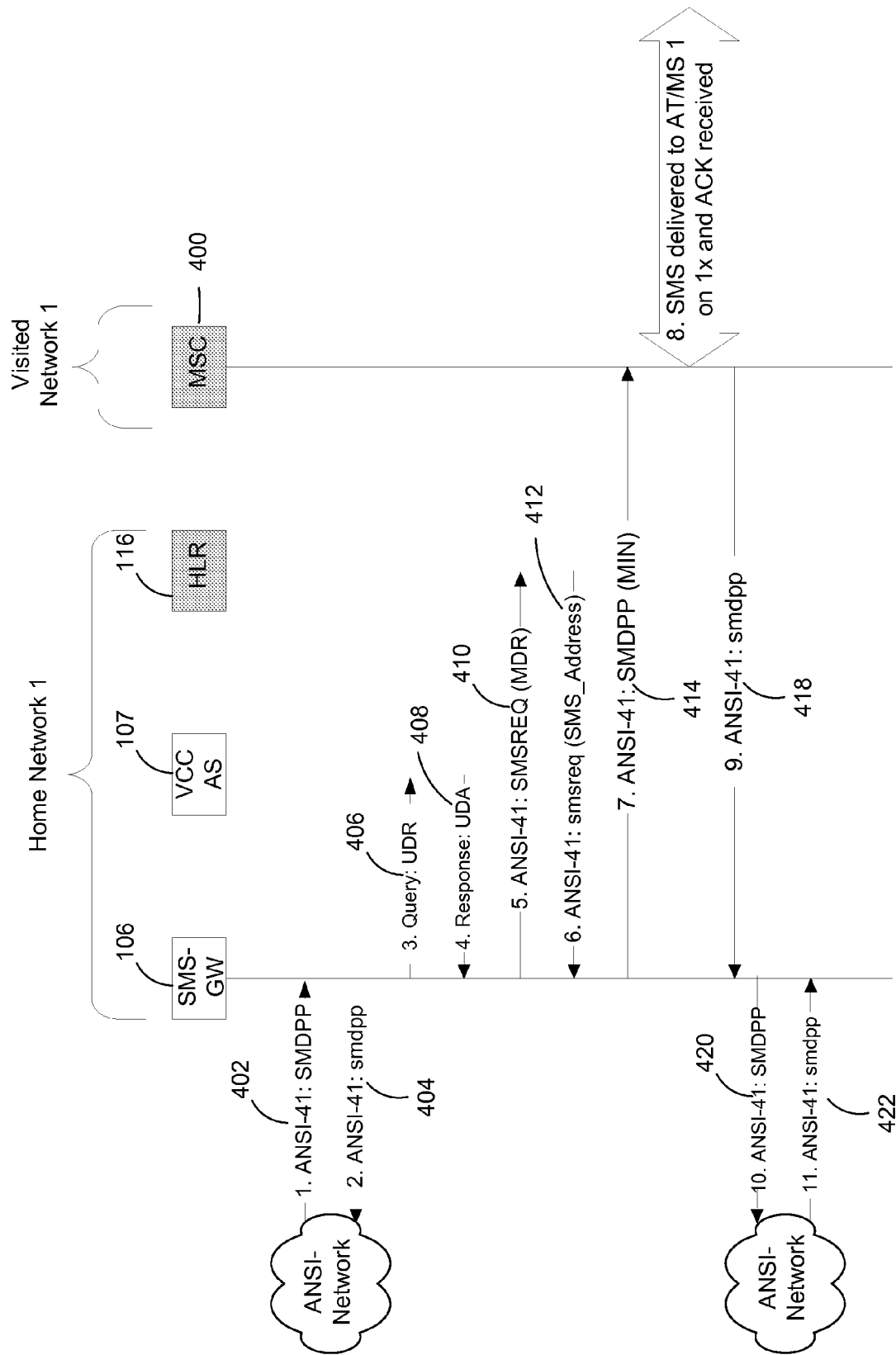
FIG. 4 illustrates a signaling flow for a scenario where a terminal is not IMS registered but is CS registered and tuned to 1x, and the SMS-GW queries the application server to determine whether the terminal is IMS registered.

Initial IMS Delivery Attempt: Querying Application Server Whether Terminal is IMS Registered In another aspect, FIG. 4 illustrates a signaling flow for a scenario where a terminal is not IMS registered but is CS registered and tuned to 1x, and the SMS-GW queries the application server to determine whether the terminal is IMS registered. With this aspect, 1. The SMS-GW 106 for the UE receives a MAP SMDPP message 402 for the UE from an originating SMS-GW. The originating SMS-GW and the UE are not shown for brevity.
2. The SMS-GW 106 responds by sending a MAP smdpp message 404 back to the sender of the MAP SMDPP message.
3. The SMS-GW 106 is provisioned to use IMS, and hence the SMS-GW 106 sends a query 406 to the VCC AS 107 to determine whether or not the UE is IMS registered. The SMS-GW 106 queries the VCC AS 107 using the MDN of the UE received in step 1.
4. The VCC AS 107 replies by sending a response 408 to the SMS-GW 106 indicating that the UE is not IMS registered.

5. The SMS-GW 106 sends a MAP SMSREQ 410 to the HLR 116 containing the UE's MDN in order to determine the UE's current routing information and retrieve the UE's MIN info.
6. The HLR 116 sends a MAP SMSREQ message 412 back to the SMS-GW 106 containing the UE's MIN and SMS address (i.e., MSC/VLR 118 address).
7. The SMS-GW 106 sends a MAP SMDPP message 414 containing the UE's MIN to a MSC 300 identified by the SMS address (i.e., MSC/VLR 118 address) in the Visited Network for the UE.
8. The SMS message is delivered to the UE on 1x and a Layer 2 ACK is received.
9. The MSC 400 in the Visited Network for the UE sends a MAP smdpp message 418 back to the SMS-GW 106.
10. If required in the original ANSI-41 SMDPP message, then the SMS-GW 106 generates an ANSI-41 SMDPP message 420 to the originating SMS-GW to inform it about the delivery status.
11. The originating SMS-GW responds by sending an ANSI-41 smdpp message 422 back to the SMS-GW 106.

Initial CS Delivery Attempt: Success Scenario

Figure 5:
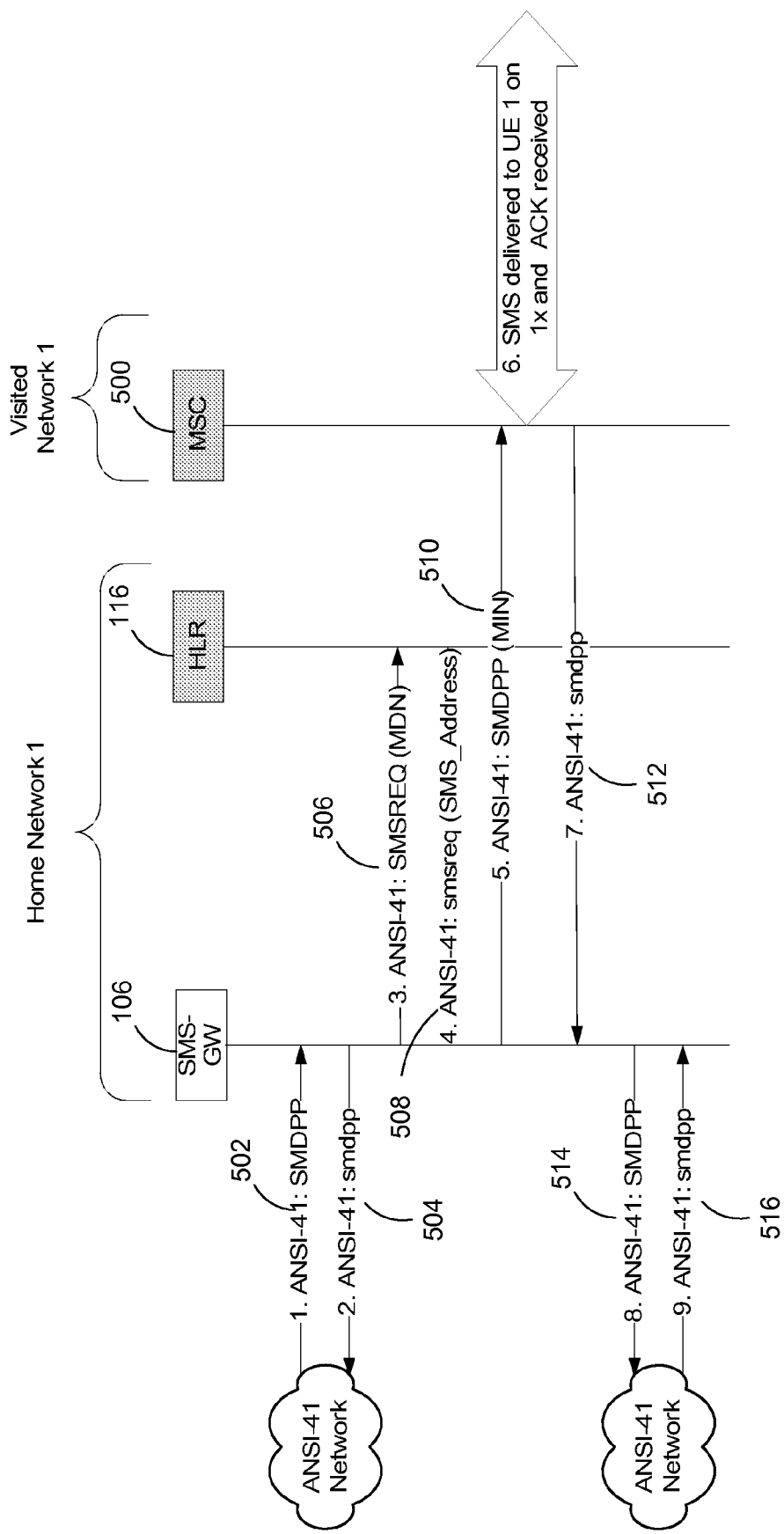
FIG. 5 illustrates a signaling flow for a scenario where a terminal is CS registered and receives an SMS message.

In another aspect, FIG. 5 illustrates a signaling flow for a scenario where a terminal is CS registered and receives an SMS message. With this aspect, 1. The SMS-GW 106 for the UE receives a MAP SMDPP message 502 for the UE from an originating SMS-GW. The originating SMS-GW is not shown for brevity. Also, the UE is not shown for brevity.
2. The SMS-GW 106 responds by sending a MAP smdpp response message 504 back to the sender of the MAP SMDPP message.
3. The SMS-GW 106 is provisioned to use CS, and hence the SMS-GW 106 sends a MAP SMSREQ 506 to the HLR 116 containing the UE's MDN in order to determine the UE's current routing information and retrieve the UE's MIN info.
4. The HLR 116 sends a MAP smsreq response message 508 back to the SMS-GW 106 containing the UE's MIN and SMS address (i.e., MSC/VLR 118 address).
5. The SMS-GW 106 sends a MAP SMDPP message 510 containing the UE's MIN to the MSC 500 identified by the SMS address (i.e., MSC/VLR 118 address) in the Visited Network for the UE.
6. The SMS message is delivered to the UE on 1x and a Layer 2 ACK is received. The UE is not shown for brevity.
7. The MSC 500 in the Visited Network for the UE sends a MAP smdpp success response message 512 back to the SMS-GW 106.
8. If required in the original MAP SMDPP message, then the SMS-GW 106 generates a new MAP SMDPP message 514 to the originating SMS-GW to inform it about the delivery status.
9. The originating SMS-GW responds by sending a MAP smdpp response message 516 back to the SMS-GW 106.

SMS Origination by UE that is IMS Registered

Figure 6:
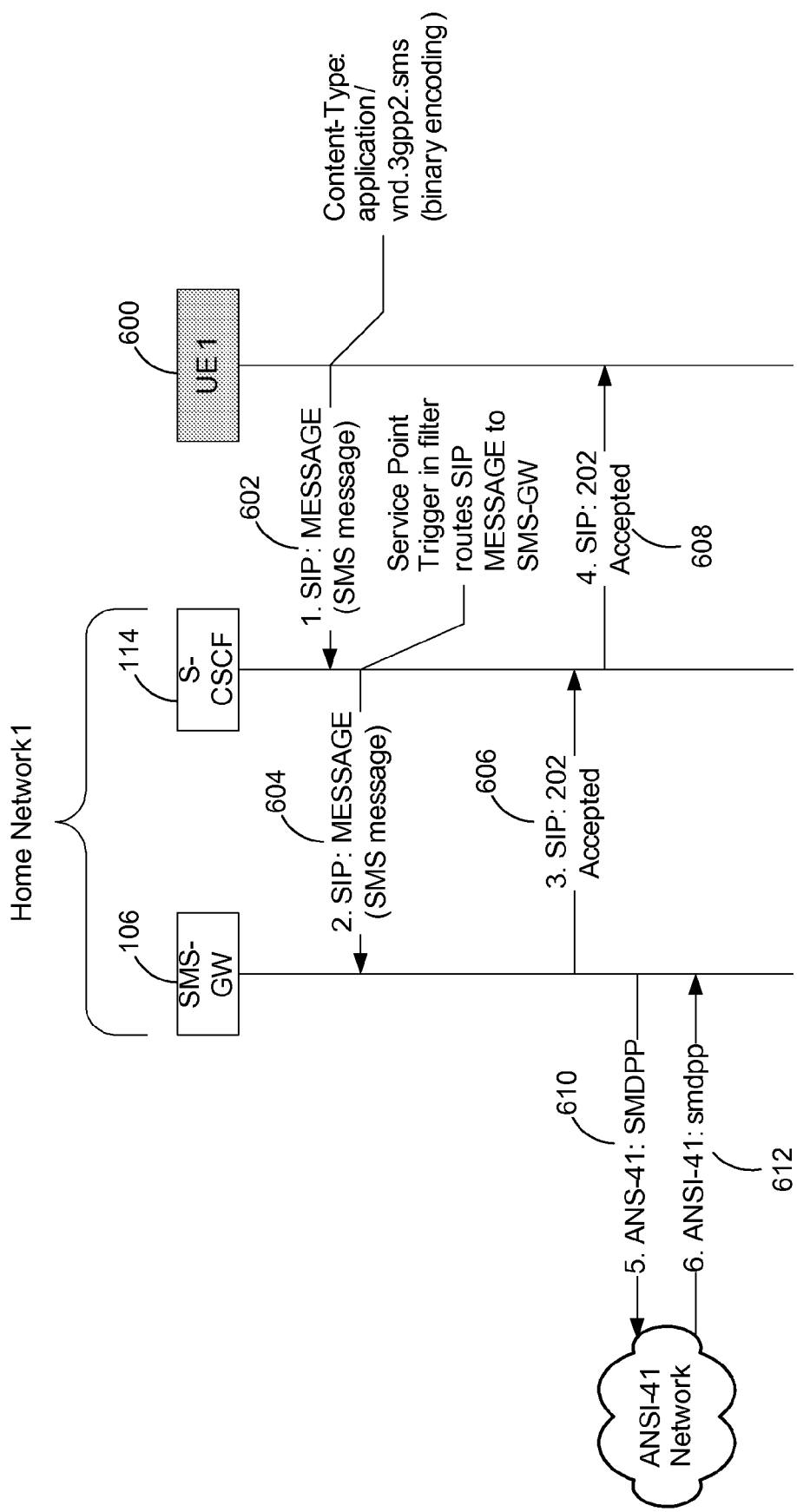
FIG. 6 illustrates a signaling flow for a scenario where a terminal that is SIP registered and tuned to HRPD to originate an SMS message.

In another aspect, FIG. 6 illustrates a signaling flow for a scenario where a terminal that is SIP registered and tuned to HRPD originates an SMS message. With this aspect, 1. AT/MS sends a SIP MESSAGE 602 to another SMS user via UE 600's P-CSCF and S-CSCF 114. The UE 600's P-CSCF is not shown for brevity. The Content-Type value associated with the SIP MESSAGE may be "application/vnd.3gpp2.sms". The payload of the SIP MESSAGE may contain a binary encoded SMS transport layer message.
2. Based upon a filter Service Point Trigger, the S-CSCF 114 forwards the SIP MESSAGE 604 to the SMS-GW 106 for AT/MS 600.
3. The SMS-GW 106 responds by sending a SIP 202 Accepted message 606 to the UE 600 via AT/MS 600's S-CSCF and P-CSCF.
4. The S-CSCF 114 forwards the SIP MESSAGE 608 to the UE 600 via the UE 600's P-CSCF. The UE 600's P-CSCF is not shown for brevity.
5. The SMS-GW 106 sends an ANSI-41 SMDPP message 610 to the terminating SMS-GW. The terminating SMS-GW is not shown for brevity.
6. The terminating SMS-GW responds by sending an ANSI-41 smdpp message 612 to the SMS-GW 106 for the UE 600.

Registration Notification

Figure 7:
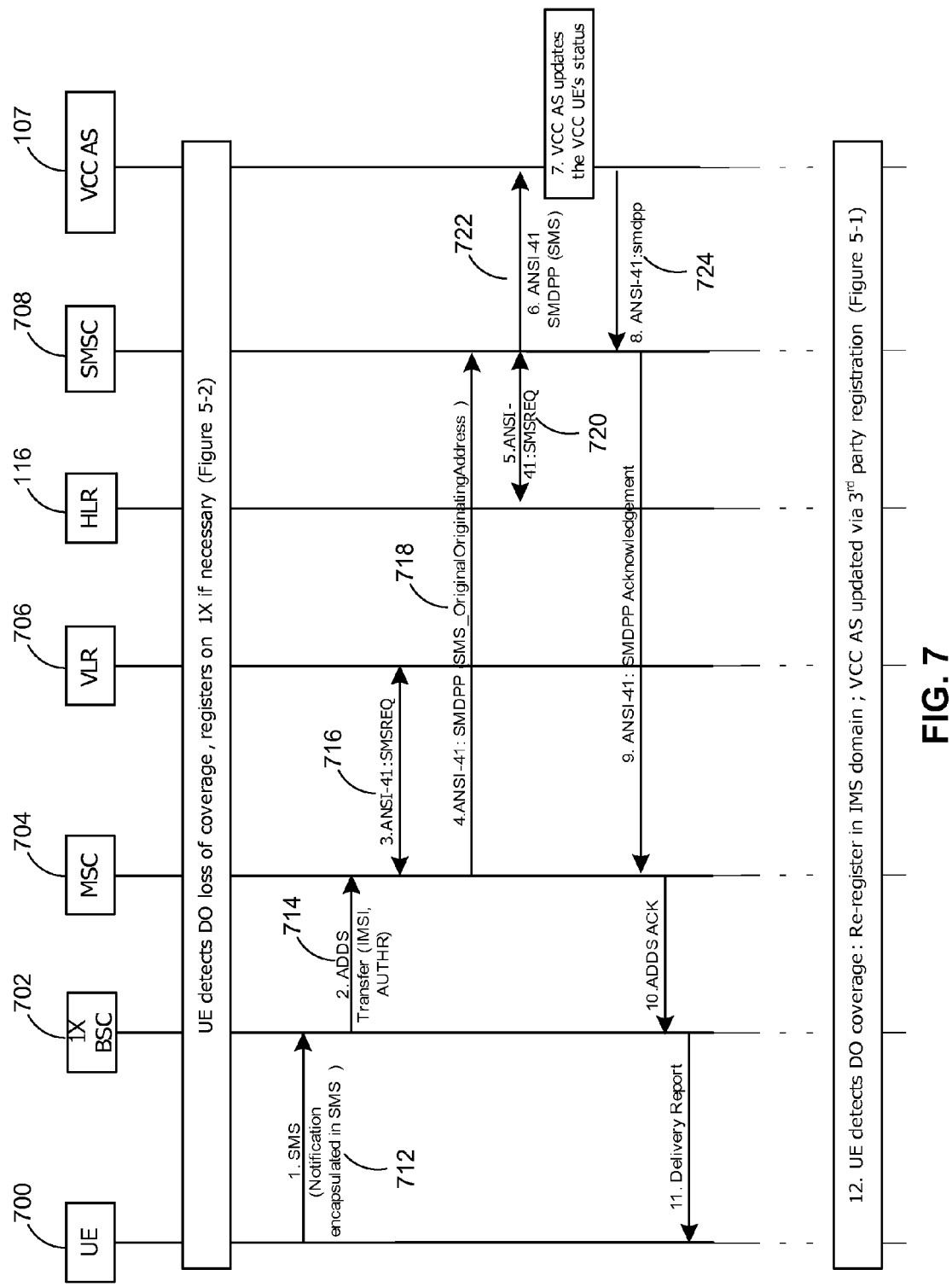
FIG. 7 illustrates a call flow of a UE initiated notification after 1x CS registration.

In another aspect, in order to remove any ambiguity in the network for call delivery, the Voice Call Continuity Application Server (VCC AS) needs to know where the MS is reachable. That is, when the UE does not detect the DO air-interface (i.e., only 1x is available), the UE sends an SMS addressed to a predetermined number, e.g., E.164, associated with the VCC AS PSI. Referring to FIG. 7, the following describes a call flow of the UE initiated notification after 1x CS registration.

1. On detecting EV-DO loss of coverage, the UE 700 registers on 1x if necessary. The UE 700 encapsulates the notification update 712 in an SMS message addressed to the VCC AS 107 (i.e., addressed to a predetermined number, e.g., E.164, associated with the VCC AS PSI, which is either provisioned at the UE or received during IMS registration procedures).
2. An ADDS_transfer message 714 is sent from the 1x BSC 702 to the Visited MSC 704.
3. The Visited MSC 704 performs a VLR lookup for the SMSC address to deliver the SMS message 716.
4. The Visited MSC 704 forwards the SMS message 718 to the SMSC 708.
5. On receipt of a SMS message, the SMSC 708 performs HLR 116 lookup 720 to locate the target address to deliver the message.
6. The SMSC 708 then delivers the message 722 to the VCC AS 107 the E.164 number resolved to.
7. The VCC AS 107 updates the state of the VCC UE in order to deliver all incoming voice calls to the UE 700 on 1x.
8. The VCC AS 107 responds to the delivered SMS message with a positive acknowledgement 724.
9-11. The delivery report message is forwarded through the SMSC/MSC to the originating UE.
12. When the DO becomes available again, the UE 700 performs an IMS re-registration and the VCC AS 107 is updated via a third party registration so that future calls are delivered using the DO air-interface.

Thus, the invention discloses techniques for providing the SMS to be delivered on DO and 1x networks or interfaces and for decreasing the load on the MSC interface. In particular, the invention offloads the MSC by delivering the SMS encapsulated in SIP on DO when DO is available. That is, if the AT monitors the DO Control Channel for pages, then the SIP-encapsulated SMS is delivered to it after reception of the DO page on a DO connection. Other aspects of the invention as described above include:

When the AT does not detect the DO air-interface (i.e., only 1x is available), the AT sends an SMS to a pre-provisioned number which is intercepted and consumed by the SMS-GW associated with the AT. The SMS-GW de-registers the mobile (from the SIP network) upon reception of this special SMS. Alternatively, the SMS-GW attempts to de-register the AT for the SMS service.

When the DO becomes available again, the AT does a SIP register so that SMS may be delivered using the DO air-interface.

This off-loads the MSC with respect to the SMS processing.

The AT and AN engage in a SIP EVENT NOTIFICATION package where the AT indicates its capability with respect to SMS delivery on DO and the network indicates either positive or negative response.

The AT originates SMS using SIP on EV-DO if SIP registration succeeds and if the SIP EVENT NOTIFICATION indicates SMS capability.

Alternatively, OTASP may be used to provision the AT with the capability of SMS over DO. If the AT gets provisioned with "SMS over DO capability", then the AT will send SMS over SIP on DO when DO is available.

Figure 8:
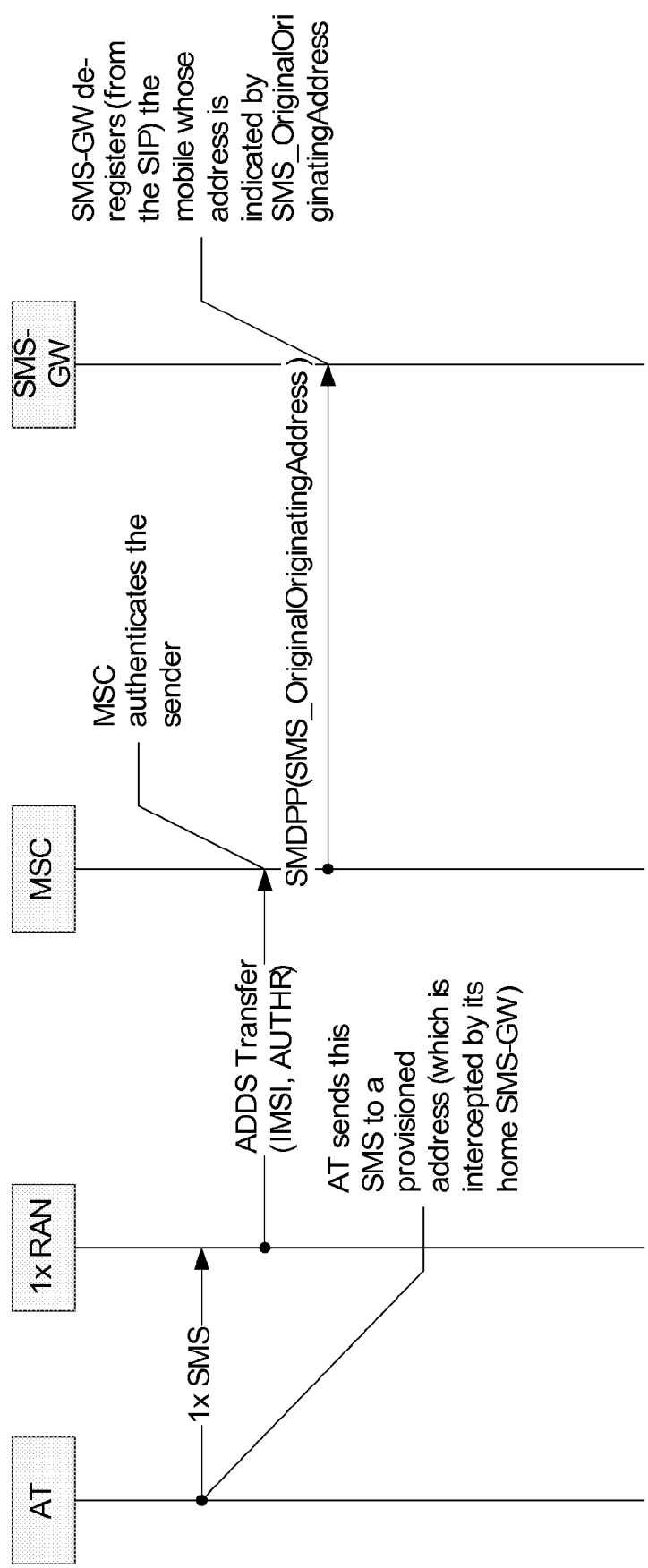
FIG. 8 illustrates a signaling flow of how the invention addresses the issue denial-of-service between multiple access terminals.

Referring to FIG. 8, there is shown another aspect of the invention where if a first AT (with a valid subscription) sends a special SMS to the SMS-GW requesting SMS delivery for a second AT to be performed on 1x (instead of DO), this will not lead to a denial-of-service problem as the MSC authenticates the originator as the ADDS Transfer message containing IMSI and AUTHR. That is, the SMS-GW compares the identity of the mobile for which the "special SMS" is sent with the SMS_OriginalOriginatingAddress. The SMS-GW then de-registers the mobile whose address is indicated by the SMS_OriginalOriginatingAddress from the SIP network. In the example illustrated in FIG. 8, the SMS_OriginalOriginatingAddress would be the address of the second AT and, therefore, the second AT may not cause de-registration of the first AT from the SIP network.

Figure 9:
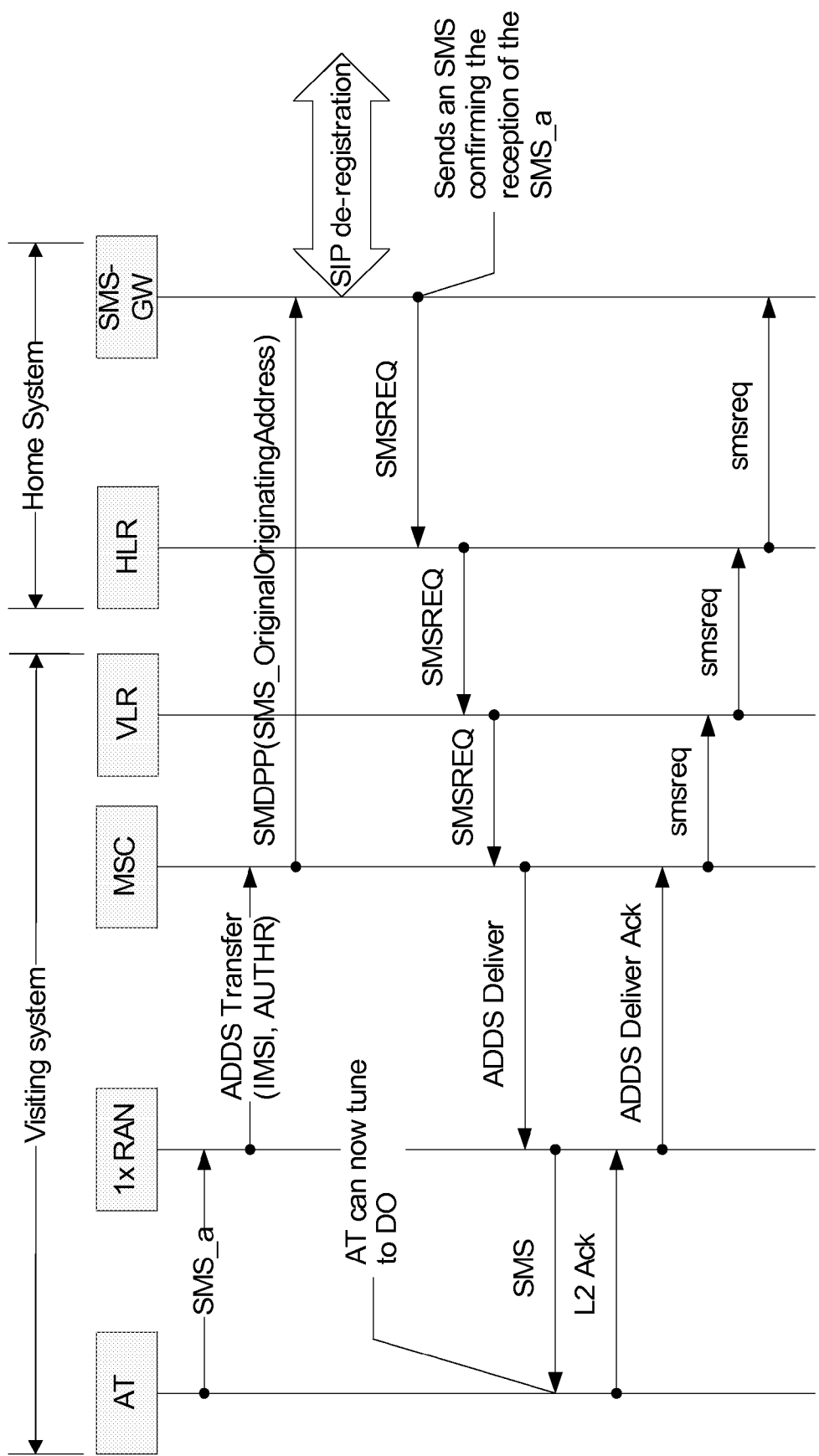
FIG. 9 illustrates a signaling flow of how the invention avoids the race condition.

In another aspect as illustrated in FIG. 9, there is shown a scenario where after the AT sends the special SMS to the SMS-GW, it is possible that it tunes to DO and sends a SIP register message. A concern here would be what if the de-registration by the SMS-GW occurs after the SIP registration. That is, would that lead to the AT being de-registered from IMS while on DO and, therefore, SMS messages would not be delivered to the AT. The invention avoids the race condition described in the above scenario by providing the SMS-GW to send an SMS to the AT confirming that the de-registration has been performed. More specifically, the AT should not tune to DO before it receives this confirmation SMS.

The invention addresses the problem of delivering SMS on DO (and hence off-loading the 1x MSC) while the voice service is still delivered on 1x. It should be noted that the invention further addresses the scenario in which the VoIP is offered on DO and the voice service is to be delivered on DO (as well as SMS). More specifically, when the AT enters the DO coverage, it performs SIP registration and when it exits the DO coverage and enters the 1x-only coverage, it sends the special SMS to the SMS-GW that leads to de-registering the AT from SIP. When a voice call arrives to a Call Continuity Control Function/Network Domain Selection (CCCF/NeDS), it would query the HLR if the AT is not SIP registered; otherwise, it will deliver the voice call on the IMS/DO.

The invention has been described such that those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method for delivering Short Message Service (SMS) to access terminals in a first communication network providing an Evolution-Data Optimized (DO) interface and a 1xRTT (1x) interface and for offloading the delivery of the SMS from a second communication network, comprising:
monitoring a DO control channel for pages by an access terminal (AT);
receiving the SMS encapsulated in Session Initiation Protocol (SIP) at the AT over the DO interface when the DO interface is available;
in response to failing to detect the DO control channel of the DO interface, sending a special SMS to a pre-provisioned number over a circuit-switched network of the second communication network that is intercepted and consumed by an SMS gateway associated with the AT, wherein the sending of the special SMS causes de-registering of the AT for SMS service by encapsulated SIP via the first communication network; and
receiving a subsequent SMS via a 1xRTT (1x) interface from the second communication network that utilizes a Mobile Switching Center (MSC).

2. The method of claim 1, further comprising tuning the AT to the DO interface when the DO interface is available.

3. The method of claim 1, further comprising sending the special SMS to the pre-provisioned number in response to determining that the AT is SIP registered for using the DO interface.

4. The method of claim 3, wherein an application server determines whether the AT is SIP registered for using the DO interface.

5. The method of claim 1, wherein if only the 1x interface is available, further comprising notifying the second communication network that the AT did not detect the DO interface to prompt delivery of the SMS over the 1x interface.

6. The method of claim 1, further comprising the AT sending the special SMS to the SMS gateway, wherein in response the SMS gateway causes an application server to remember that the AT is now monitoring the first communication network.

7. The method of claim 1, further comprising sending an SMS to deregister the AT from the SMS by encapsulated SIP when exiting the DO interface.

8. The method of claim 1, wherein when the DO interface is available again, further comprising performing a SIP registration for the AT to allow SMS by encapsulated SIP to be delivered over the DO interface.

9. The method of claim 1, wherein the AT and the first and second communication networks engage in a SIP notification where the AT indicates its ability to receive or send SMS on the DO interface and the networks indicate either a positive or a negative response.

10. The method of claim 9, wherein the AT originates SMS using SIP on the DO interface if a SIP registration succeeds and if the SIP notification indicates SMS capability.

11. The method of claim 1, wherein Over the Air Service Provisioning (OTASP) provisions the AT with the capability of SMS over the DO interface.

12. The method of claim 11, wherein if the AT gets provisioned with SMS over the DO interface capability, then the AT will send or receive SMS over SIP on the DO interface when the DO interface is available.

13. The method of claim 1, further comprising receiving a voice call on the DO interface or the 1x interface in accordance with a call continuity control function/network domain selector (CCCF/NeDS) that engages the first and second communication networks in a Session Initiation Protocol (SIP) notification to determine whether the SMS or voice call is to be delivered on the DO interface or the 1x interface.

14. The method of claim 13, wherein if the AT is not SIP registered, then further comprising delivering the SMS or voice call on the 1x interface.

15. The method of claim 13, wherein if the AT is SIP registered, wherein if the AT is indicated as being capable of receiving voice using SIP notification, and wherein if a record for indicating whether the AT is monitoring the DO interface or the 1x interface is set to the DO interface, then the voice call is delivered on the DO interface.

16. The method of claim 13, wherein if the AT is SIP registered, wherein if the AT is indicated as being capable of receiving SMS using SIP notification, and wherein if a record for indicating whether the AT is monitoring the DO interface or the 1x interface is set to the DO interface, then the SMS is delivered on the DO interface.

17. The method of claim 1, further comprising:
determining that all of the active set members support Voice over IP (VoIP); and
then the AT sending a SIP notification indicating that a voice call is to be delivered on the DO interface.

18. The method of claim 17, further comprising:
determining that at least one of the active set members does not support VoIP; and
sending a SIP notification indicating that the voice call is to be delivered on the 1x interface.

19. A non-transitory computer-readable storage medium having control logic stored therein for causing at least one processor to deliver Short Message Service (SMS) to access terminals in a first communication network providing an Evolution-Data Optimized (DO) interface and a 1xRTT (1x) interface and to offload the delivery of the SMS from a second communication network, comprising:
a first set of instructions for causing the at least one processor to monitor a DO control channel for pages by an access terminal (AT);
a second set of instructions for causing the at least one processor to receive the SMS encapsulated in Session Initiation Protocol (SIP) at the AT over the DO interface when the DO interface is available;
a third set of instructions for causing the at least one processor, in response to failing to detect the DO control channel of the DO interface, to send a special SMS to a pre-provisioned number over a circuit-switched network of the second communication network that is intercepted and consumed by an SMS gateway associated with the AT, wherein the special SMS causes de-registering of the AT for SMS service by encapsulated SIP via the first communication network; and
a fourth set of instructions for causing the at least one processor to receive a subsequent SMS via a 1xRTT (1x) interface from the second communication network that utilizes a Mobile Switching Center (MSC).

20. At least one processor for delivering Short Message Service (SMS) to access terminals in a first communication network providing an Evolution-Data Optimized (DO) interface and a 1xRTT (1x) interface and for offloading the delivery of the SMS from a second communication network, comprising:
a first module for monitoring a DO control channel for pages by an access terminal (AT);
a second module for receiving the SMS encapsulated in Session Initiation Protocol (SIP) at the AT over the DO interface when the DO interface is available;
a third module for, in response to failing to detect the DO control channel of the DO interface, sending a special SMS to a pre-provisioned number over a circuit-switched network of the second communication network that is intercepted and consumed by an SMS gateway associated with the AT, wherein the special SMS causes de-registering of the AT for SMS service by encapsulated SIP via the first communication network; and a fourth module for receiving a subsequent SMS via a 1xRTT (1x) interface from the second communication network that utilizes a Mobile Switching Center (MSC).

21. An apparatus for delivering Short Message Service (SMS) to access terminals in a first communication network providing an Evolution-Data Optimized (DO) interface and a 1xRTT (1x) interface and for offloading the delivery of the SMS from a second communication network, comprising:

means for monitoring a DO control channel for pages by an access terminal (AT);

means for receiving the SMS encapsulated in Session Initiation Protocol (SIP) at the AT over the DO interface when the DO interface is available;

means for, in response to failing to detect the DO control channel of the DO interface, sending a special SMS to a pre-provisioned number over a circuit-switched network of the second communication network that is intercepted and consumed by an SMS gateway associated with the AT, wherein the special SMS causes de-registering of the AT for SMS service by encapsulated SIP via the first communication network; and means for receiving SMS via a 1xRTT (1x) interface from the second communication network that utilizes a Mobile Switching Center (MSC).

22. An apparatus for delivering Short Message Service (SMS) to access terminals in a first communication network providing an Evolution-Data Optimized (DO) interface and a 1xRTT (1x) interface and for offloading the delivery of the SMS from a second communication network, comprising:

a receiver for:
monitoring a DO control channel for pages by an access terminal (AT); and
receiving the SMS encapsulated in Session Initiation Protocol (SIP) at the AT over the DO interface when the DO interface is available; and a transmitter, in response to failing to detect the DO control channel of the DO interface, is configured for sending a special SMS to a pre-provisioned number over a circuit-switched network of the second communication network that is intercepted and consumed by an SMS gateway associated with the AT, wherein the special SMS causes de-registering of the AT for SMS service by encapsulated SIP via the first communication network; and wherein the receiver is further configured for receiving a subsequent SMS via a 1 xRTT (1x) interface from the second communication network that utilizes a Mobile Switching Center (MSC).

23. The apparatus of claim 22, wherein the receiver is further for tuning the AT to the DO interface when the DO interface is available.

24. The apparatus of claim 22, wherein the transmitter is further for sending the special SMS to the pre-provisioned number in response to determining that the AT is SIP registered for using the DO interface.

25. The apparatus of claim 24, further comprising an application server for determining whether the AT is SIP registered for using the DO interface.

26. The apparatus of claim 22, wherein if only the 1x interface is available, the transmitter is further for notifying the second communication network that the AT did not detect the DO interface to prompt delivery of the SMS over the 1x interface.

27. The apparatus of claim 22, wherein the transmitter is further for sending the special SMS to the SMS gateway, wherein in response the SMS gateway causes an application server to remember that the AT is now monitoring the first communication network.

28. The apparatus of claim 22, wherein the transmitter is further for sending an SMS to deregister the AT from the SMS by encapsulated SIP when exiting the DO interface.

29. The apparatus of claim 22, wherein the transmitter and receiver are further for, when the DO interface is available again, performing a SIP registration for the AT to allow SMS by encapsulated SIP to be delivered over the DO interface.

30. The apparatus of claim 22, wherein the transmitter and receiver are further for engaging the first and second communication networks in a SIP notification where the AT indicates its ability to receive or send SMS on the DO interface and the networks indicate either a positive or a negative response.

31. The apparatus of claim 30, wherein transmitter and receiver are further for SMS using SIP on the DO interface if a SIP registration succeeds and if the SIP notification indicates SMS capability.

32. The apparatus of claim 22, wherein the receiver is further for being provisioned by Over the Air Service Provisioning (OTASP) with the capability of SMS over the DO interface.

33. The apparatus of claim 32, wherein if the AT gets provisioned with SMS over the DO interface capability, then the AT will send or receive SMS over SIP on the DO interface when the DO interface is available.

34. The apparatus of claim 22, wherein the receiver is further for receiving a voice call on the DO interface or the 1x interface in accordance with a call continuity control function/network domain selector (CCCF/NeDS) that engages the first and second communication networks in a Session Initiation Protocol (SIP) notification to determine whether the SMS or voice call is to be delivered on the DO interface or the 1x interface.

35. The apparatus of claim 34, wherein if the AT is not SIP registered, then the transmitter and receiver are further for delivering the SMS or voice call on the 1x interface.

36. The apparatus of claim 34, wherein if the AT is SIP registered, wherein if the AT is indicated as being capable of receiving voice using SIP notification, and wherein if a record for indicating whether the AT is monitoring the DO interface or the 1x interface is set to the DO interface, then the transmitter and receiver are further for delivering the voice call on the DO interface.

37. The apparatus of claim 34, wherein if the AT is SIP registered, wherein if the AT is indicated as being capable of receiving SMS using SIP notification, and wherein if a record for indicating whether the AT is monitoring the DO interface or the 1x interface is set to the DO interface, then the transmitter and receiver are further for delivering SMS on the DO interface.

38. The apparatus of claim 22, further comprising a processor for determining that all of the active set members support Voice over IP (VoIP); and
wherein the transmitter is further configured for sending a SIP notification indicating that a voice call is to be delivered on the DO interface.

39. The apparatus of claim 38, further comprising a processor for determining that at least one of the active set members does not support VoIP; and wherein the transmitter is further for sending a SIP notification indicating that the voice call is to be delivered on the 1x interface.

40. A method for delivering Short Message Service (SMS) to access terminals in a first communication network providing an Evolution-Data Optimized (DO) interface and a 1xRTT (1x) interface and for offloading the delivery of the SMS from a second communication network, comprising:
   transmitting a DO control channel for monitoring for pages by an access terminal (AT);
   delivering the SMS encapsulated in Session Initiation Protocol (SIP) to the AT over the DO interface when the DO interface is available;
   receiving a special SMS at a pre-provisioned number over a circuit-switched network of the second communication network that is intercepted and consumed by an SMS gateway associated with the AT, wherein the special SMS is sent in response to failing to detect the DO control channel of the DO interface, wherein the special SMS causes de-registering of the AT for SMS service by encapsulated SIP via the first communication network; and
   delivering a subsequent SMS via a 1xRTT (1x) interface from the second communication network that utilizes a Mobile Switching Center (MSC).

41. The method of claim 40, further comprising:
   receiving the special SMS from the AT at the SMS gateway; and
   the SMS gateway causing an application server to remember that the AT is now monitoring the first communication network.

42. The method of claim 40, further comprising receiving an SMS to deregister the AT from the SMS by encapsulated SIP when the AT exits the DO interface.

43. The method of claim 42, wherein when the DO interface is available again, further comprising performing a SIP registration for the AT to allow SMS by encapsulated SIP to be delivered over the DO interface.

44. The method of claim 40, wherein the AT and the first and second communication networks engage in a SIP notification where the AT indicates its ability to receive or send SMS on the DO interface and the networks indicate either a positive or a negative response.

45. The method of claim 40, wherein Over the Air Service Provisioning (OTASP) provisions the AT with the capability of SMS over the DO interface.

46. The method of claim 45, wherein if the AT gets provisioned with SMS over the DO interface capability, then the AT will send or receive SMS over SIP on the DO interface when the DO interface is available.

47. The method of claim 40, further comprising:
   a call continuity control function/network domain selector (CCCF/NeDS) engaging the first and second communication networks in a Session Initiation Protocol (SIP) notification to determine whether the SMS or a voice call is to be delivered on the DO interface or the 1x interface; and
   delivering the voice call on the DO interface or the 1x interface in accordance with the determination.

48. The method of claim 47, wherein if the AT is not SIP registered, then further comprising delivering the SMS or voice call on the 1x interface.

49. The method of claim 47, wherein if the AT is SIP registered, wherein if the AT is indicated as being capable of receiving voice using SIP notification, and wherein if a record for indicating whether the AT is monitoring the DO interface or the 1x interface is set to the DO interface, then the voice call is delivered on the DO interface.

50. The method of claim 47, wherein if the AT is SIP registered, wherein if the AT is indicated as being capable of receiving SMS using SIP notification, and wherein if a record for indicating whether the AT is monitoring the DO interface or the 1x interface is set to the DO interface, then the SMS is delivered on the DO interface.

51. The method of claim 47, further comprising:
   receiving a SIP notification indicating that a voice call is to be delivered on the DO interface in response to a determination that all of the active set members support Voice over IP (VoIP); and
   receiving a SIP notification indicating that the voice call is to be delivered on the 1x interface in response to a determination that at least one of the active set members does not support Voice over IP (VoIP).

52. A non-transitory computer-readable storage medium having control logic stored therein for causing at least one processor to deliver Short Message Service (SMS) to access terminals in a first communication network providing an Evolution-Data Optimized (DO) interface and a 1 xRTT (1x) interface and to offload the delivery of the SMS from a second communication network, comprising:
   a first set of instructions for causing the at least one processor to transmit a DO control channel for pages by an access terminal (AT);
   a second set of instructions for causing the at least one processor to deliver the SMS encapsulated in Session Initiation Protocol (SIP) to the AT over the DO interface when the DO interface is available;
   a third set of instructions for causing the at least one processor to receive a special SMS at a pre-provisioned number over a circuit-switched network of the second communication network that is intercepted and consumed by an SMS gateway associated with the AT, wherein the special SMS is sent in response to failing to detect the DO control channel of the DO interface, and the special SMS causes de-registering of the AT for SMS service by encapsulated SIP via the first communication network; and
   a fourth set of instructions for causing the at least one processor to deliver a subsequent SMS via a 1 xRTT (1x) interface from the second communication network that utilizes a Mobile Switching Center (MSC).

53. At least one processor for delivering Short Message Service (SMS) to access terminals in a first communication network providing an Evolution-Data Optimized (DO) interface and a 1xRTT (1x) interface and for offloading the delivery of the SMS from a second communication network, comprising:
   a first module for transmitting a DO control channel for monitoring for pages by an access terminal (AT);
   a second module for delivering the SMS encapsulated in Session Initiation Protocol (SIP) to the AT over the DO interface when the DO interface is available;
   a third module for receiving a special SMS at a pre-provisioned number over a circuit-switched network of the second communication network that is intercepted and consumed by an SMS gateway associated with the AT, wherein the special SMS is sent in response to failing to detect the DO control channel of the DO interface, and the special SMS causes de-registering of the AT for SMS service by encapsulated SIP via the first communication network; and a fourth module for delivering a subsequent SMS via a 1xRTT (1x) interface from the second communication network that utilizes a Mobile Switching Center (MSC).

54. An apparatus for delivering Short Message Service (SMS) to access terminals in a first communication network providing an Evolution-Data Optimized (DO) interface and a 1xRTT (1x) interface and for offloading the delivery of the SMS from a second communication network, comprising:

means for transmitting a DO control channel for monitoring for pages by an access terminal (AT);

means for delivering the SMS encapsulated in Session Initiation Protocol (SIP) to the AT over the DO interface when the DO interface is available;

means for receiving a special SMS at a pre-provisioned number over a circuit-switched network of the second communication network that is intercepted and consumed by an SMS gateway associated with the AT, wherein the special SMS is sent in response to failing to detect the DO control channel of the DO interface, and the special SMS causes de-registering of the AT for SMS service by encapsulated SIP via the first communication network; and means for delivering a subsequent SMS via a 1xRTT (1x) interface from the second communication network that utilizes a Mobile Switching Center (MSC).

55. An apparatus for delivering Short Message Service (SMS) to access terminals in a first communication network providing an Evolution-Data Optimized (DO) interface and a 1xRTT (1x) interface and for offloading the delivery of the SMS from a second communication network, comprising:

a transmitter for transmitting a DO control channel for monitoring for pages by an access terminal (AT);

a network for delivering the SMS encapsulated in Session Initiation Protocol (SIP) to the AT over the DO interface when the DO interface is available;

an SMS gateway for receiving a special SMS at a pre-provisioned number over a circuit-switched network of the second communication network that is intercepted and consumed by an SMS gateway associated with the AT, wherein the special SMS is sent in response to failing to detect the DO control channel of the DO interface, wherein the SMS gateway causes de-registering of the AT for SMS service by encapsulated SIP via the first communication network; and wherein the transmitter and a receiver are configured for delivering SMS via a 1 xRTT (1x) interface from the second communication network that utilizes a Mobile Switching Center (MSC).

56. The apparatus of claim 55, wherein the receiver is further for receiving the special SMS from the AT at the SMS gateway; and the SMS gateway causing an application server to remember that the AT is now monitoring the first communication network.

57. The apparatus of claim 55, wherein the receiver is for receiving an SMS to deregister the AT from the SMS by encapsulated SIP when the AT exits the DO interface.

58. The apparatus of claim 57, wherein when the DO interface is available again, the SMS gateway further for performing a SIP registration for the AT to allow SMS by encapsulated SIP to be delivered over the DO interface.

59. The apparatus of claim 55, wherein the AT and the first and second communication networks engage in a SIP notification where the AT indicates its ability to receive or send SMS on the DO interface and the networks indicate either a positive or a negative response.

60. The apparatus of claim 55, wherein Over the Air Service Provisioning (OTASP) provisions the AT with the capability of SMS over the DO interface.

61. The apparatus of claim 60, wherein if the AT gets provisioned with SMS over the DO interface capability, then the AT will send or receive SMS over SIP on the DO interface when the DO interface is available.

62. The apparatus of claim 55, further comprising:

a call continuity control function/network domain selector (CCCF/NeDS) engaging the first and second communication networks in a Session Initiation Protocol (SIP) notification to determine whether the SMS or a voice call is to be delivered on the DO interface or the 1x interface; and wherein the transmitter and receiver are further for delivering the voice call on the DO interface or the 1x interface in accordance with the determination.

63. The apparatus of claim 62, wherein if the AT is not SIP registered, then further comprising delivering the SMS or voice call on the 1x interface.

64. The apparatus of claim 62, wherein if the AT is SIP registered, wherein if the AT is indicated as being capable of receiving voice using SIP notification, and wherein if a record for indicating whether the AT is monitoring the DO interface or the 1x interface is set to the DO interface, then the voice call is delivered on the DO interface.

65. The apparatus of claim 62, wherein if the AT is SIP registered, wherein if the AT is indicated as being capable of receiving SMS using SIP notification, and wherein if a record for indicating whether the AT is monitoring the DO interface or the 1x interface is set to the DO interface, then the SMS is delivered on the DO interface.

66. The apparatus of claim 62, wherein the receiver is further for receiving a SIP notification indicating that a voice call is to be delivered on the DO interface in response to a determination that all of the active set members support Voice over IP (VoIP), and for receiving a SIP notification indicating that the voice call is to be delivered on the 1x interface in response to a determination that at least one of the active set members does not support Voice over IP (VoIP).

\* \* \* \* \*